(12) United States Patent
Okagawa et al.

(10) Patent No.: US 6,783,669 B1
(45) Date of Patent: Aug. 31, 2004

(54) ROTATING DISK TYPE SEWAGE TREATMENT DEVICE

(75) Inventors: Fumihiko Okagawa, Shiga (JP); Hitoshi Inoue, Tokyo (JP)

(73) Assignee: Sekisui Aqua Systems Co., Ltd., Osaka (JP)

( * ) Notice: Subject to any disclaimer, the term of this patent is extended or adjusted under 35 U.S.C. 154(b) by 0 days.

(21) Appl. No.: 10/220,285

(22) PCT Filed: Mar. 10, 2000

(86) PCT No.: PCT/JP00/01459

§ 371 (c)(1),
(2), (4) Date: Sep. 10, 2002

(87) PCT Pub. No.: WO01/66473

PCT Pub. Date: Sep. 13, 2001

(51) Int. Cl.[7] .................................................. C02F 3/08
(52) U.S. Cl. ...................................... 210/150; 210/619
(58) Field of Search ............................... 210/150, 151, 210/619

(56) References Cited

U.S. PATENT DOCUMENTS

| | | | | |
|---|---|---|---|---|
| 4,330,408 A | * | 5/1982 | McClure | 210/150 |
| 4,345,997 A | * | 8/1982 | McConnell et al. | 210/150 |
| 4,530,763 A | * | 7/1985 | Clyde et al. | 210/619 |
| 4,549,962 A | * | 10/1985 | Koelsch | 210/150 |
| 4,999,302 A | * | 3/1991 | Kahler et al. | 210/619 |
| 5,395,529 A | * | 3/1995 | Butler | 210/151 |
| 5,425,874 A | * | 6/1995 | Gass | 210/150 |

FOREIGN PATENT DOCUMENTS

| | | |
|---|---|---|
| JP | 58-6559 | 2/1983 |
| JP | 60-241995 | 11/1985 |
| JP | 6-99184 | 4/1994 |
| JP | 8-57492 | 3/1996 |
| WO | WO 81/02730 | * 10/1981 |

* cited by examiner

Primary Examiner—Christopher Upton
(74) Attorney, Agent, or Firm—Armstrong, Kratz, Quintos, Hanson & Brooks, LLP

(57) ABSTRACT

Rotating biological contactor-type sewage treatment equipment of the present invention comprises a treatment tank 4 for storing sewage to be treated, a rotation shaft 3 which extends across opposed side walls 4a, 4b of the treatment tank 4, a plurality of rotating discs 1 mounted at a predetermined interval on the rotation shaft 3 in such a manner that each disc is partly submerged in the sewage stored in the treatment tank 4, and a driving means for supplying a driving force to the rotation shaft 3 in order to rotate the rotating discs 1. This equipment treats sewage by rotating the rotating discs 1 on which aerobic bacteria are attached, thereby allowing the aerobic bacteria to contact the sewage and aerobically decompose pollutants in the sewage. Each of the rotating discs 1 is composed of n portions of sector-shaped segments 11, wherein n is an integer not less than 1, and each of the sector-shaped segments 11 is composed of two equally divided sector-shaped pieces 11a, 11b. Each of the sector-shaped pieces 11a, 11b has thin elements 19a, 19b which form square grid-like meshes 191 of the same size, except in the neighborhood of a periphery surrounding each sector-shaped piece 11a, 11b; and the thin elements 19a, 19b extend vertically and horizontally relative to one side of each sector-shaped piece 11a, 11b, with crossing each other.

5 Claims, 12 Drawing Sheets

Fig.13
(a)
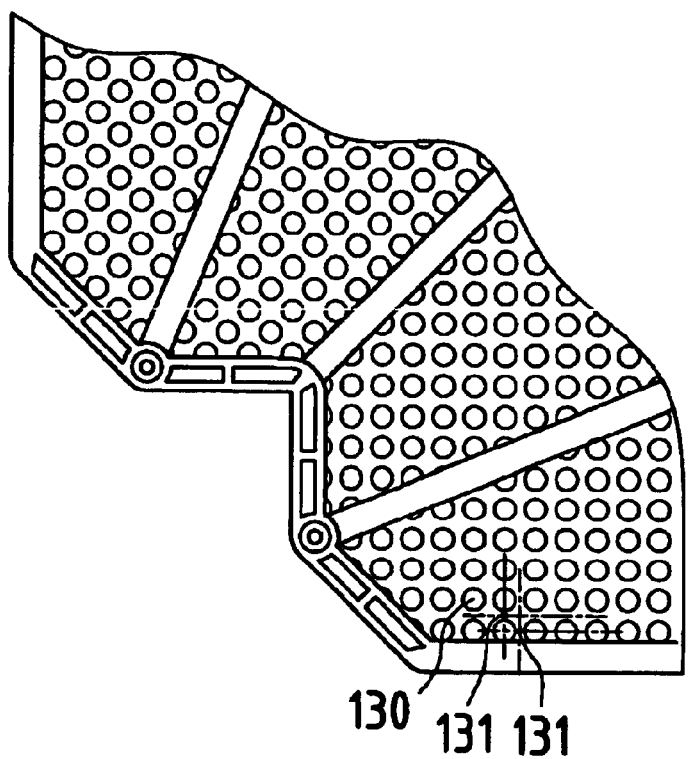
(b)
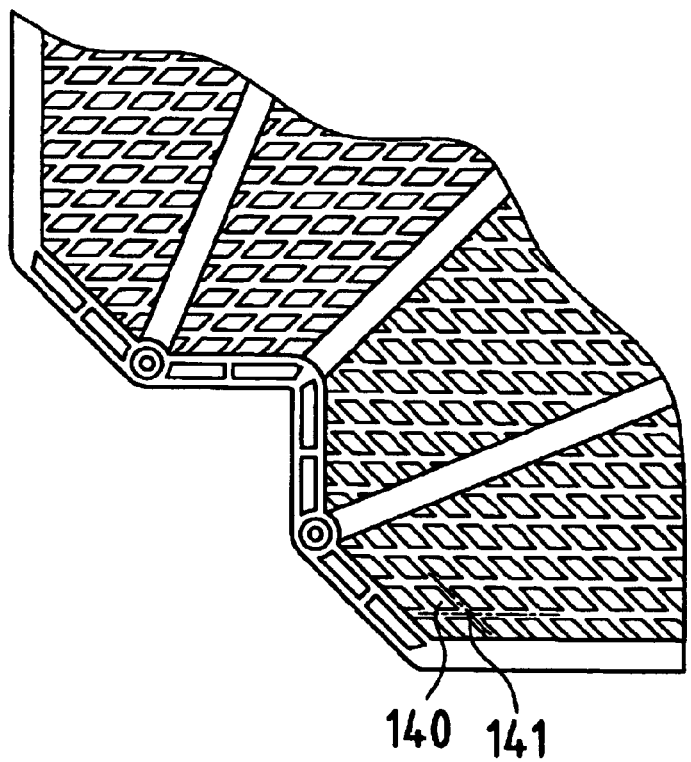

US 6,783,669 B1

ROTATING DISK TYPE SEWAGE TREATMENT DEVICE

TECHNICAL FIELD

The present invention relates to rotating biological contactor-type sewage treatment equipment.

BACKGROUND ART

A conventional example of rotating biological contactor-type sewage treatment equipment is disclosed in Japanese Patent Laid-open Publication No. H6-99184. This sewage treatment equipment includes a plurality of spaced rotating discs which are mounted on a rotating shaft. Each of the rotating discs is allowed to rotate, with a part of the disc being submerged in sewage in the treatment tank. In this equipment, sewage is treated through contact between the sewage and aerobic bacteria adhered to the rotating discs.

Such sewage treatment equipment is required to treat sewage efficiently, reduce the initial investment, cut the cost for maintaining its operation, simplify the operation management, and more. From these viewpoints, the above conventional technology has satisfied these requirements to a certain degree. Recently, however, there are additional demands for rotating biological contactor-type sewage treatment equipment which can achieve a further excellent sewage treatment performance and a greater cost reduction.

The present invention is made in the light of such circumstances, and intends to provide rotating biological contactor-type sewage treatment equipment which realizes a further excellent sewage treatment performance and a greater cost reduction.

DISCLOSURE OF THE INVENTION

In order to achieve the above object, the biological contactor-type sewage treatment equipment of the present invention comprises a treatment tank for storing sewage to be treated, a rotation shaft which extends across opposed side walls of the treatment tank, a plurality of rotating discs mounted at a predetermined interval on the rotation shaft in such a manner that each rotating disc is partly submerged in the sewage stored in the treatment tank, and a driving means for supplying a driving force to the rotation shaft in order to rotate the rotating discs, the sewage treatment equipment treating sewage by rotating the rotating discs on which aerobic bacteria are attached, thereby allowing the aerobic bacteria to contact the sewage and aerobically decompose pollutants in the sewage. This sewage treatment equipment is arranged such that each of the rotating discs is composed of n portions of sector-shaped segments, wherein n is an integer not less than 1, each of the sector-shaped segments being composed of two equally divided sector-shaped pieces and each of the sector-shaped pieces having thin elements which form meshes; that the meshes have the same size and shape except in the neighborhood of a periphery surrounding the each sector-shaped piece, and an arrangement of the meshes is regularly aligned in the same direction relative to one side of the each sector-shaped piece; that projections project from predetermined locations on the thin elements and extend perpendicularly relative to each surface of each rotating disc; and that, in an installation state where adjacent rotating discs are displaced from each other by $360°/2n$ in a direction of rotation, projections which locate on one of the adjacent rotating discs are oriented to openings in the meshes formed by the thin elements of another rotating disc.

The angle given by the general formula $360°/2n$ is one half the central angle of the sector-shaped segment, provided that one rotating disc is divided into n segments. In other words, regardless of the size and number of the sector-shaped segments, the rotating discs are displaced from each other by one half the central angle of one sector-shaped segment (the central angle of the sector-shaped piece).

The rotating discs applied to this arrangement are provided with square grid-like meshes as shown in FIG. 4, circular meshes 130 as shown in FIG. 13(a), parallelogramatic meshes 140 or rhombic meshes as shown in FIG. 13(b), etc. In the rotating discs shown in FIG. 4 and FIG. 13(b), the projections preferably locate at intersections 19c and intersections 141 of the thin elements, respectively. In the rotating disc shown in FIG. 13(a), projections are preferably provided at midpoints 131 of line segments connecting the centers of the circles.

Regarding the above arrangement, it is preferable that each of the sector-shaped pieces has thin elements which cross each other to form meshes; that the meshes have the same size and shape except in the neighborhood of a periphery surrounding the each sector-shaped piece, and an arrangement of the meshes is regularly aligned in the same direction relative to one side of the each sector-shaped piece; and that projections project from intersections of the thin elements and extend perpendicularly relative to each surface of each rotating disc.

The rotating discs which adopt this arrangement include, for example, those shown in FIG. 4 and FIG. 13(b).

Further in the above arrangement, it is preferable that the thin elements in each of the sector-shaped pieces form square grid-like meshes of the same size, except in the neighborhood of a periphery surrounding the each sector-shaped piece; and that the thin elements extend vertically and horizontally relative to one side of the each sector-shaped piece, with crossing each other.

The rotating discs which adopt this arrangement include, for example, the one shown in FIG. 4.

Preferably, between the two sector-shaped pieces which constitute the sector-shaped segment, the thin elements which extend vertically or horizontally relative to a side of one of the sector-shaped pieces are located at different positions, as compared with the thin elements which extend vertically or horizontally relative to a corresponding side of the other sector-shaped piece. Owing to this arrangement, in an installation state where adjacent rotating discs are displaced from each other by $360°/2n$ in a direction of rotation, projections which locate on one of the adjacent rotating discs are oriented to openings in the meshes formed by the thin elements of another rotating disc.

Additionally, in any of the above arrangements, each of the sector-shaped pieces preferably includes an insertion hole for passing a fixing rod which connects the plurality of rotating discs mounted at a predetermined interval, the insertion hole locating along a line which divides the each sector-shaped piece into two equal sector-shaped portions. This arrangement enables mutual connection of the rotating discs. Besides, with the rotating discs being fixed at the respective positions, the projections are positioned to orient to the openings in the meshes formed by the thin elements.

In the rotating biological contactor-type sewage treatment equipment of the present invention which adopts any of these arrangements, adjacent rotating discs which are spaced by a predetermined interval are displaced from each other by $360°/2n$ in a direction of rotation. Hence, with respect to the adjacent rotating discs 1, 1, projections provided along the meshes of a first rotating disc are oriented to openings surrounded by the thin elements which form the meshes in a second rotating disc, and projections provided along the meshes of the second rotating disc are oriented to openings surrounded by the thin elements which form the meshes in the first rotating disc. Then, the projections of the adjacent rotating discs mutually protrude toward the openings in the respective meshes. As a result, the rotating biological contactor-type sewage treatment equipment of the present invention shows the following functions (i)–(v), which enhance efficiency in sewage treatment.

(i) Between adjacent rotating discs, the thin elements which form the meshes cooperate with the projections to construct a three-dimensional structure. These thin elements and projections always maintain a predetermined space in all of the three-dimensional directions, so that they do not contact each other. Therefore, the rotating discs make a sufficient contact with air and sewage, without the fear of clogging.

(ii) The rotating discs have a large surface area per unit volume.

(iii) The sewage treatment equipment does not block water flow in the axial direction, thereby providing many practical treatment stages.

(iv) The aeration effect due to the projections on the discs increases the amount of oxygen supply to sewage.

(v) The sewage treatment equipment is rich in biofilms which induce a transfer phenomenon on a macro scale.

Further, with the following functions (1)–(3), the rotating biological contactor-type sewage treatment equipment of the present invention improves safety in sewage treatment.

(1) Biofilms on all rotating discs do not slough off at a time, which prevents deterioration of treated water.

(2) Since biofilms are spaced evenly, the meshes are not clogged by excessive attachment of the biofilms.

(3) The rotating discs receive stresses caused by various factors (e.g. resistance of sewage, attachment condition of aerobic bacteria). Nevertheless, the rotating discs can maintain the mechanical strength against such stresses.

Incidentally, the rotating discs used in the present invention can be made of conventional materials for rotating discs, without particular limitations. For example, use can be made of vinyl chloride resins, polyethylenes, polypropylenes, polycarbonates, FRPs and other synthetic resins, as well as stainless steel, aluminium and other metals.

BRIEF DESCRIPTION OF DRAWINGS

FIG. 13 shows examples of mesh structures in the sector-shaped segment applied to the rotating biological contactor-type sewage treatment equipment according to the present invention.

BEST MODE FOR CARRYING OUT THE INVENTION

Figure 1:
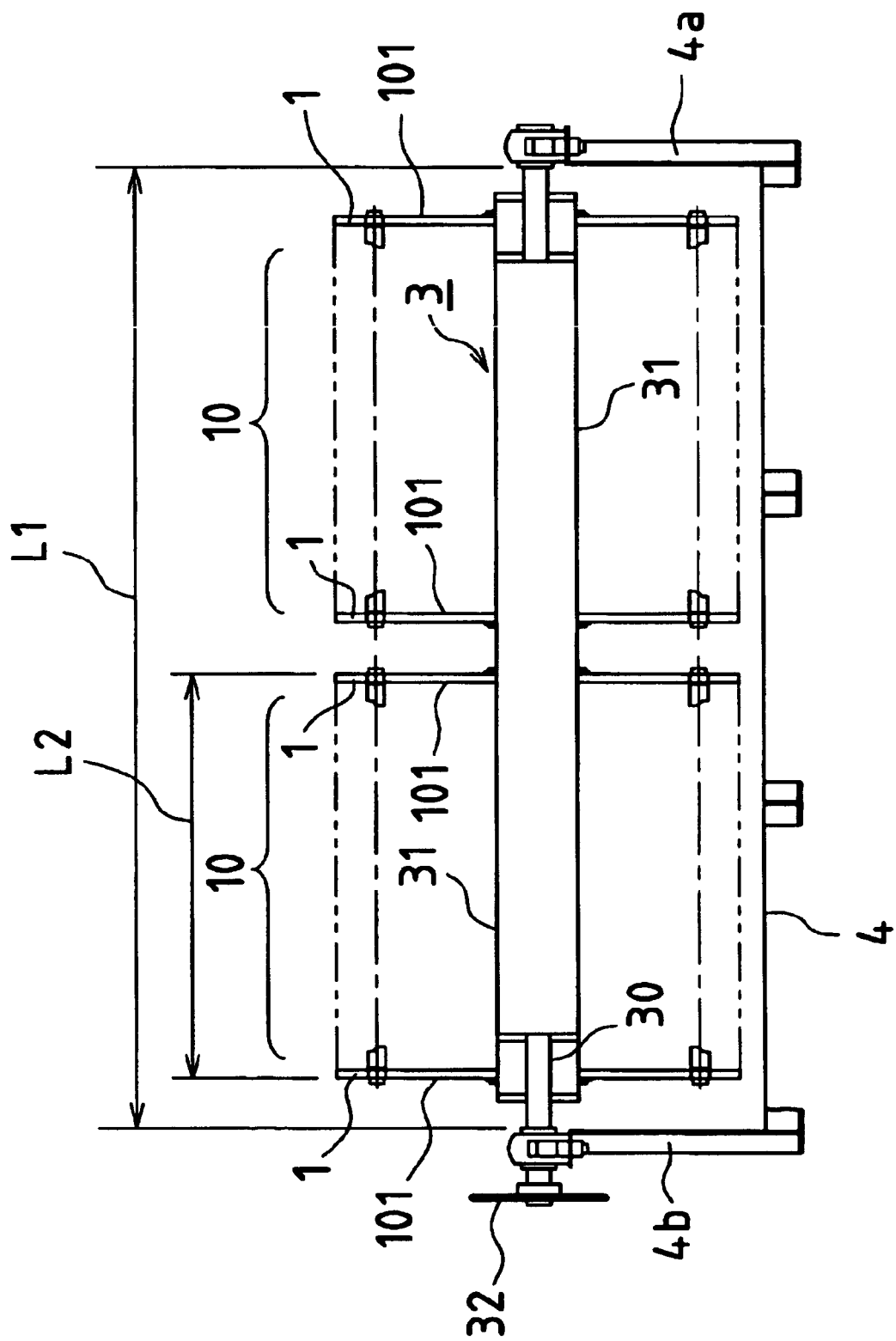
FIG. 1 is a partially cutaway front view showing an embodiment of the rotating biological contactor-type sewage treatment equipment according to the present invention.

Referring to the drawings, description is made on embodiments of the rotating biological contactor-type sewage treatment equipment according to the present invention.

Figure 2:
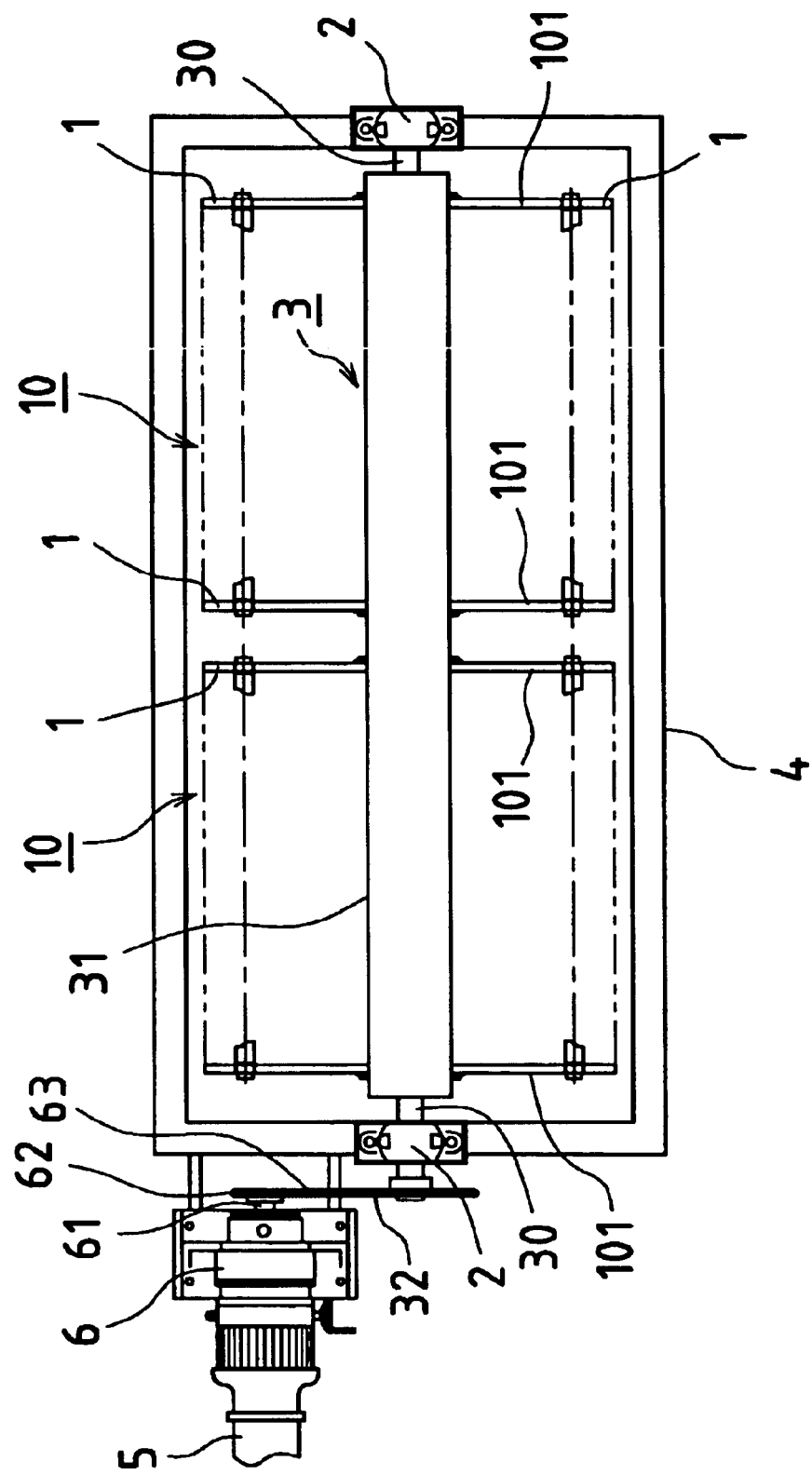
FIG. 2 is a plan view showing the embodiment of FIG. 1 according to the present invention.
Figure 3:
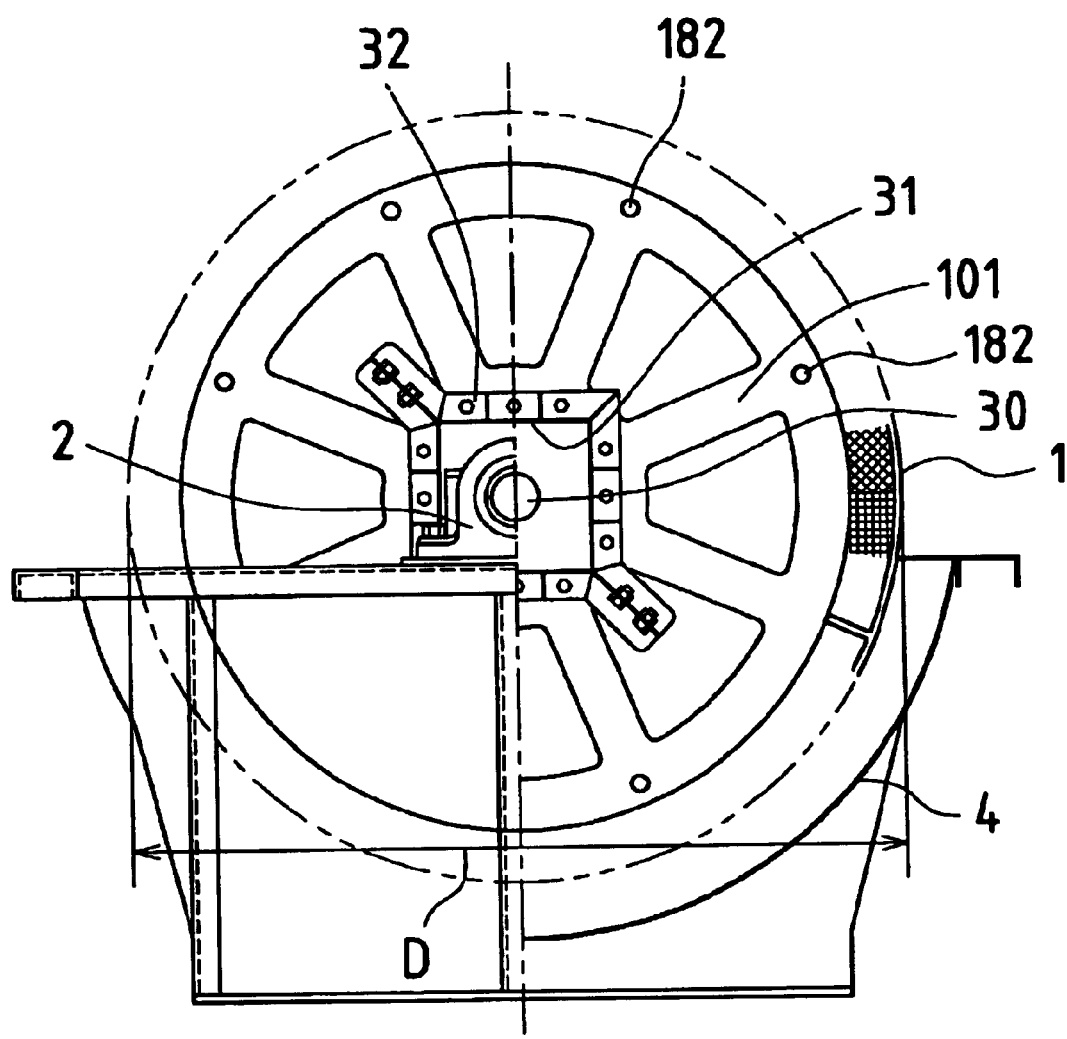
FIG. 3 is a partially cutaway side view showing the embodiment of FIG. 1 according to the present invention.

FIG. 1 is a partially cutaway front view showing an embodiment of the rotating biological contactor-type sewage treatment equipment according to the present invention. FIG. 2 is a plan view showing the embodiment of FIG. 1 according to the present invention. FIG. 3 is a partially cutaway side view showing the embodiment of FIG. 1 according to the present invention.

In this embodiment of the present invention, the rotating biological contactor-type sewage treatment equipment is equipped with a semi-cylindrical treatment tank 4 for storing sewage to be treated. Rotating discs 1 . . . 1 rotate around a rotation shaft 3 which is composed of a mounting shaft portion 31 and shaft ends 30 secured to the mounting shaft portion 31. The rotation shaft 3 extends across opposed side walls 4a, 4b of the treatment tank 4, with the shaft ends 30 being borne by bearings 2 provided in the side walls 4a, 4b. The rotating discs 1 . . . 1 are mounted at a prescribed interval on the mounting shaft portion 31, in such a manner that each rotating disc is partly submerged in the sewage in the treatment tank 4. A predetermined number of rotating discs 1 . . . 1 constitute a rotating disc block 10. Each block 10 is equipped with support plates 101 for holding the rotating discs 1 . . . 1. In the present embodiment, two such blocks are provided.

A driving mechanism for driving the rotating discs 1 . . . 1 is constructed in the following manner.

The rotation shaft 3 is equipped with a sprocket wheel 32, which is linked with a sprocket wheel 62 and a chain 63. The sprocket wheel 62 and chain 63 are mounted on a driving shaft 61 of a variable speed reducer 6 which is directly connected to a motor 5.

In this driving mechanism, rotation of the motor 5 is slowed down by the variable speed reducer 6. The driving shaft 61 transmits the decelerated rotation to the rotation shaft 3, via the sprocket wheel 62, the chain 63 and the sprocket wheel 32. The rotation of the rotation shaft 3 causes rotation of the rotating discs 1 . . . 1 mounted thereon.

Now, the structure of the rotating discs 1 is mentioned.

Figure 4:
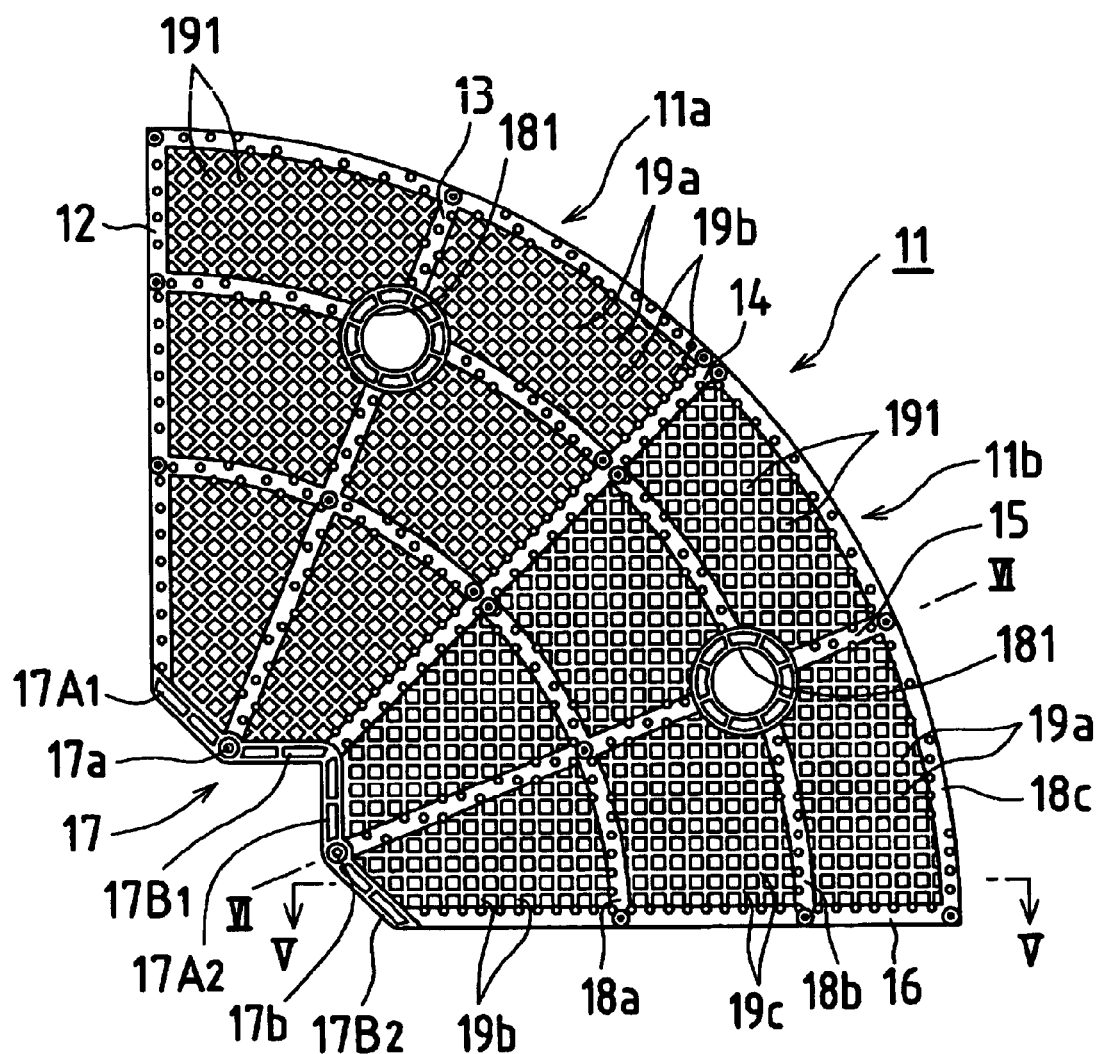
FIG. 4 is a front view showing a sector-shaped segment applied to embodiments according to the present invention.
Figure 5:
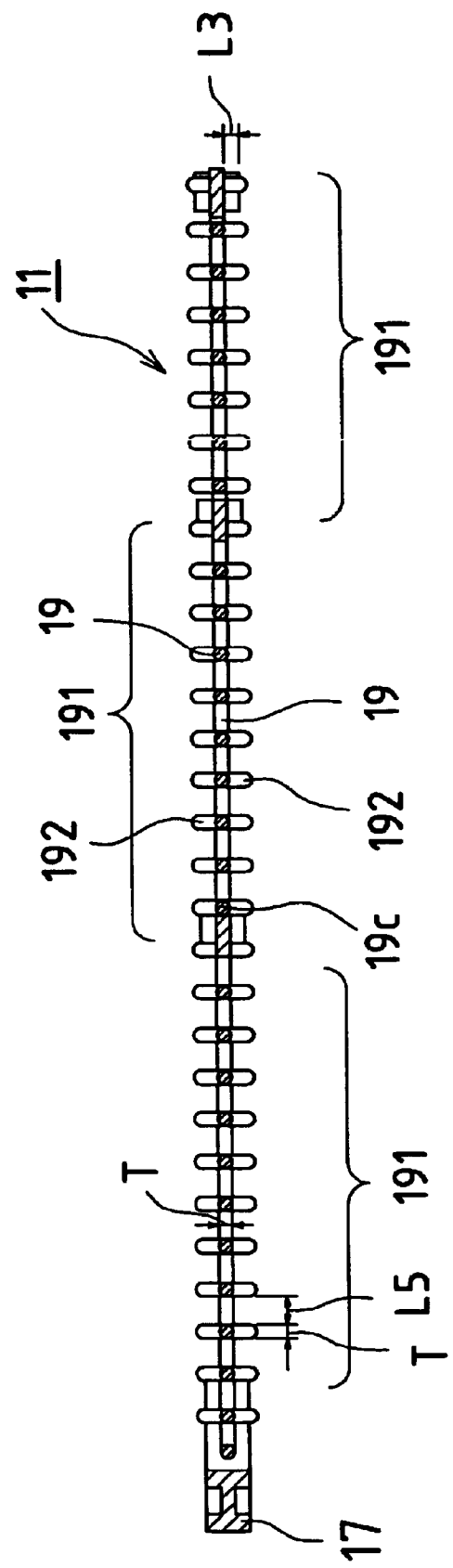
FIG. 5 is a sectional view taken along the line V—V in FIG. 4.
Figure 6:
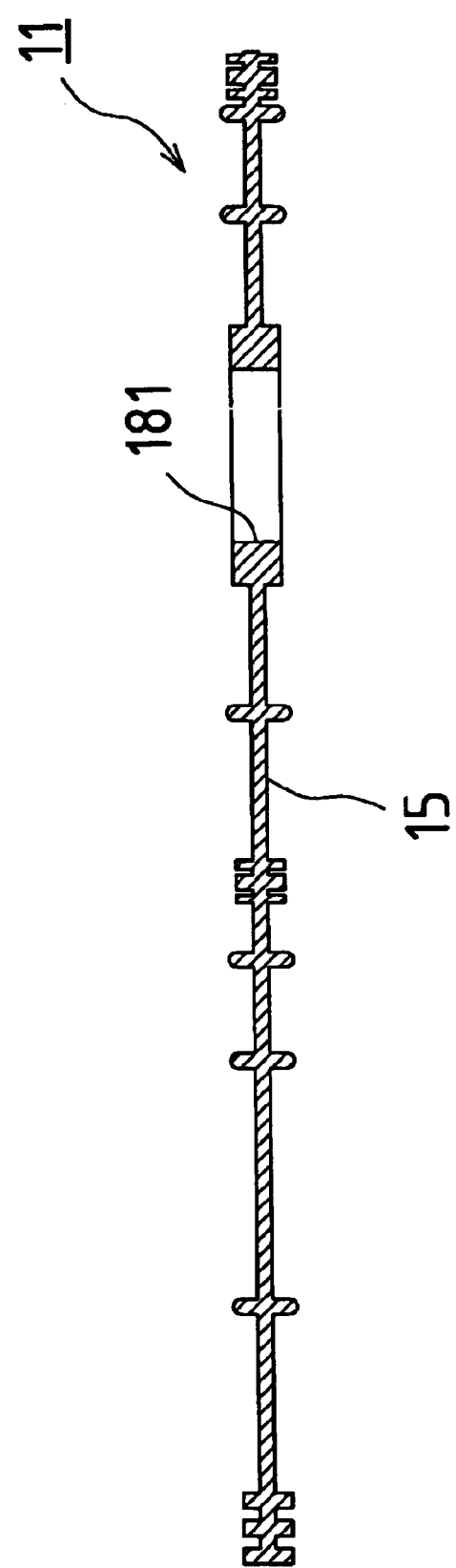
FIG. 6 is a sectional view taken along the line VI—VI in FIG. 4.

FIG. 4 is a front view showing a sector-shaped segment applied to embodiments according to the present invention. FIG. 5 is a sectional view taken along the line V—V in FIG. 4. FIG. 6 is a sectional view taken along the line VI—VI in FIG. 4.

As illustrated in FIG. 4, the outline of a sector-shaped segment 11 is defined by linear parts 12, 16, an inner edge 17 of the sector-shaped segment 11 which fits around the mounting shaft portion 31 of the rotation shaft 3 and which serves as a mounting portion thereto, and an arc part 18c along the external periphery. In addition, the sector-shaped segment 11 is divided by a linear part 14 into two adjacent sector-shaped pieces 11a, 11b. The sector-shaped pieces 11a, 11b have linear parts 13, 15 which divide the respective pieces into two sector-shaped portions, and also include arc parts 18a, 18b composed of concentric arcs. These parts constitute a reinforcement structure for the rotating disc. The inner edge 17 is constituted with V-shaped inner edges formed by an edge $17A_1$ and an edge $17B_1$ in the sector-shaped piece 11a, and by an edge $17A_2$ and an edge $17B_2$ in the sector-shaped piece 11b. As for the positional relationship, the edge $17A_1$ and the linear part 14, the edge $17B_1$ and the linear part 12, the edge $17A_2$ and the linear part 16, and the edge $17B_2$ and the linear part 14 cross orthogonally over each other along their elongated lines.

Besides, in the two sector-shaped pieces 11a, 11b, thin elements 19b and thin elements 19a extend vertically and horizontally relative to one corresponding side of each piece, i.e. the linear parts 14, 16. These thin elements cross each other to form square grid-like meshes 191. As illustrated in FIG. 5, projections 192 are provided at intersections of the thin elements 19a, 19b and protrude perpendicularly relative to the sector-shaped surfaces of the sector-shaped segment 11.

Figure 9:
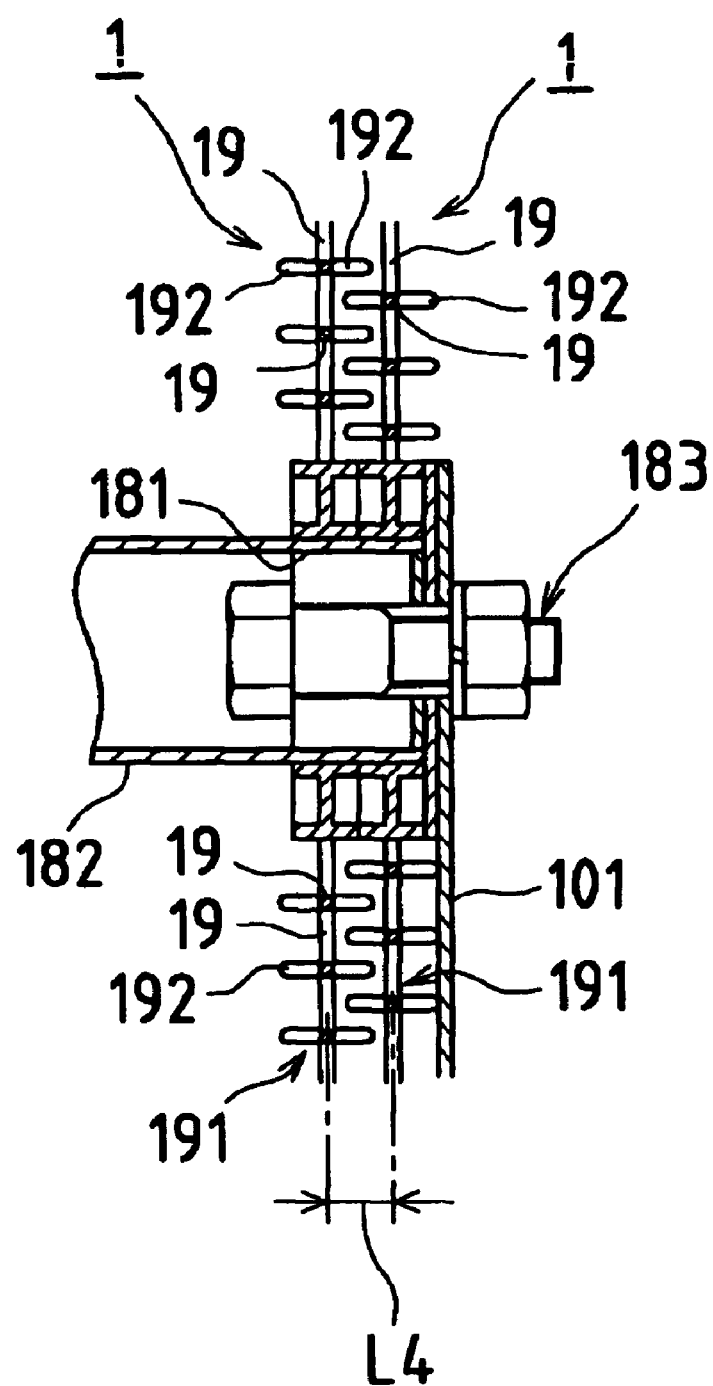
FIG. 9 is an enlarged sectional view showing a connection area between rotating discs of the embodiment of FIG. 1 according to the present invention.
Figure 10:
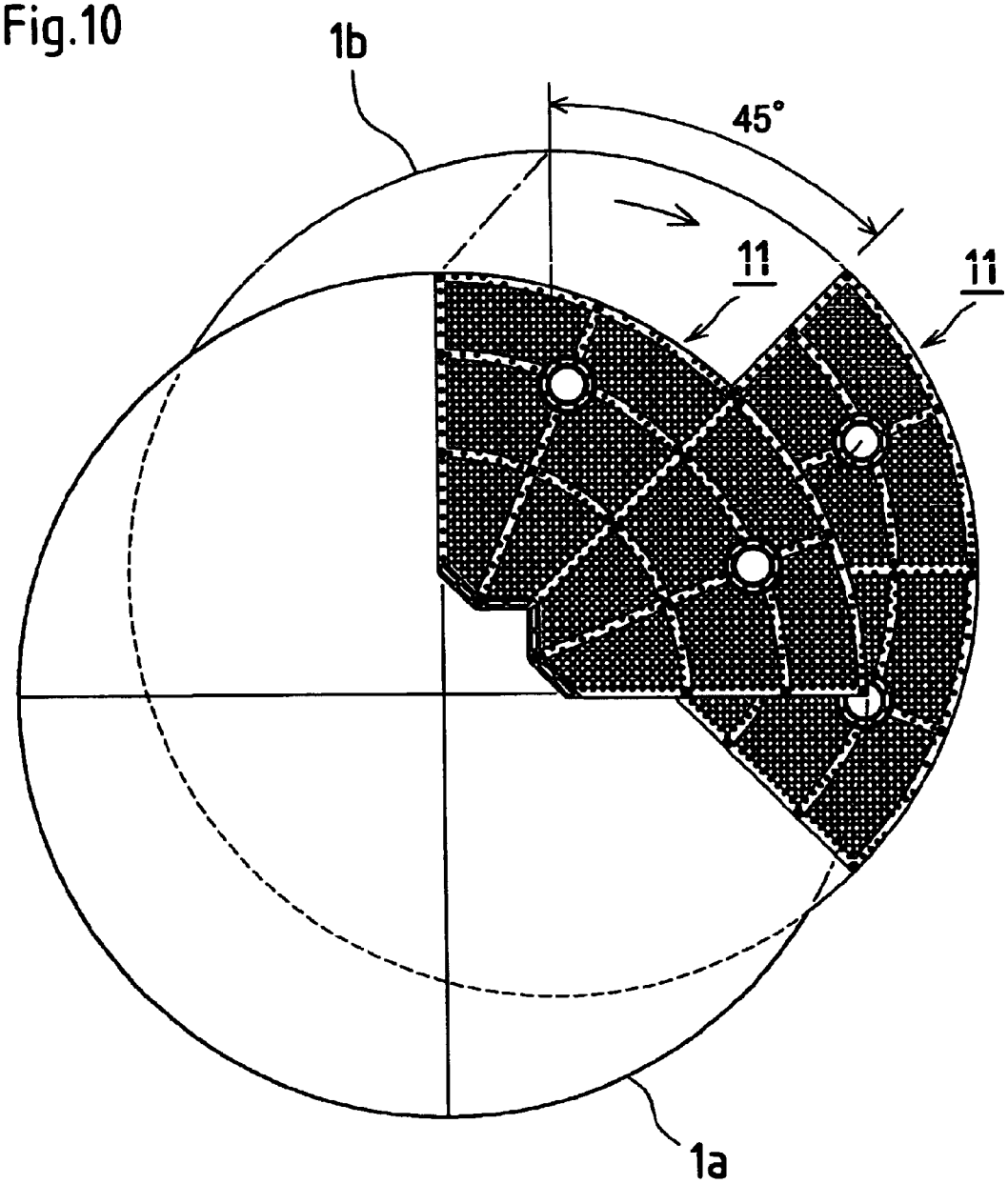
FIG. 10 explains an arrangement of adjacent rotating discs in the embodiment of FIG. 1 according to the present invention.
Figure 12:
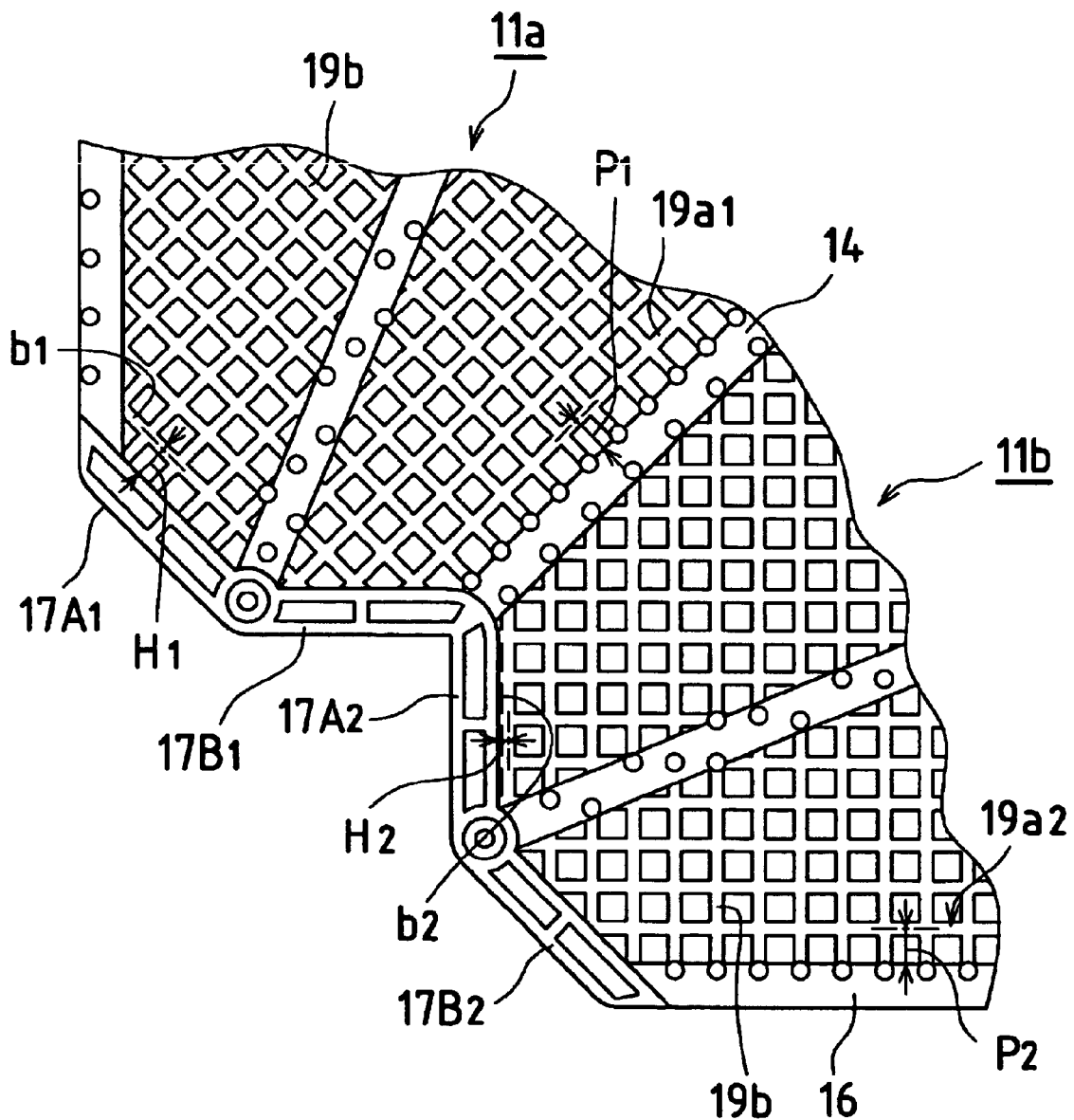
FIG. 12 explains an arrangement of a sector-shaped segment applied to embodiments of the rotating biological contactor-type sewage treatment equipment according to the present invention.

According to the design, the square grid-like meshes 191 are not in precise square form in the neighborhood of the outline of the sector-shaped pieces 11a, 11b. In an installed state, projections 192 on one of the adjacent rotating discs 1 are oriented to the openings in the meshes 191 formed by the thin elements 19a, 19b of the other rotating disc. A specific construction for achieving this structure is realized in an arrangement composed of the linear parts 12, 14, 16 of the sector-shaped pieces 11a, 11b, the edges $17A_1$, $17B_1$, $17A_2$, $17B_2$ constituting the inner edge 17, and the thin elements 19a, 19b forming the square grid-like meshes 191. As illustrated in FIG. 12, the thin elements 19b and the thin elements 19a extend vertically and horizontally, respectively, relative to one corresponding side of each sector-shaped piece 11a, 11b (i.e. the linear part 14, 16), with relative positions of the thin elements 19a, 19b being different between these sector-shaped pieces. In this embodiment, the lengths from the linear parts 14, 16, to the thin horizontal elements $19a_1$, $19a_2$ which locate at the start area of the thin vertical elements 19b, can be regarded as the vertical start dimension $P_1$ in the sector-shaped piece 11a and the vertical start dimension $P_2$ in the sector-shaped piece 11b. Then, $P_1$ and $P_2$ are related by $P_1 < P_2$. On the other hand, the edges $17A_1$, $17A_2$ in the sector-shaped pieces 11a, 11b are spaced by gaps $H_1$, $H_2$ from first thin elements $b_1$, $b_2$ which extend parallel to these edges. Then, the gaps $H_1$, $H_2$ are related by $H_1 > H_2$. Under these conditions, the sector-shaped segment 11 is formed by adjusting the vertical start dimensions $P_1$, $P_2$ and the gaps $H_1$, $H_2$. As illustrated in FIG. 10, each of the rotating discs of the present embodiment is composed of four sector-shaped segments 11. In this case, one rotating disc 1b is rotated 45° relative to another rotating disc 1a, so that they are angularly displaced in the direction of rotation. Consequently, as shown in FIG. 9, the projections 192 provided along the square grid-like meshes 191 in a first rotating disc 1 are oriented to the center of the openings in the square grid-like meshes 191 which are formed by the thin elements 19 of a second rotating disc 1, whereas the projections 192 provided along the square grid-like meshes 191 in the second rotating disc 1 are oriented to the center of the openings in the square grid-like meshes 191 which are formed by the thin elements 19 of the first rotating disc 1.

Now, referring to FIG. 4 and FIG. 6, fixing rod insertion holes 181 are formed at intersections between the arc part 18b and the linear parts 13, 15, respectively, so to enable insertion of fixing rods 182 for connecting the rotating discs 1 . . . 1. The fixing rods 182 may be poles or pipes. Pipes are advantageous in keeping the strength with a reduced weight. Additionally, inner edge-connecting projections 17a, 17b are provided at the V-shaped tips of the inner edge 17. On the reverse side of the sector-shaped segment 11, inner edge-connecting recesses (not shown) are formed at the corresponding positions. In the state where the rotating discs 1 . . . 1 are installed, the inner edge-connecting projections 17a, 17b are mutually fit with the inner edge-connecting recesses, so that the rotating discs 1 . . . 1 are connected at the inner edge.

Figure 7:
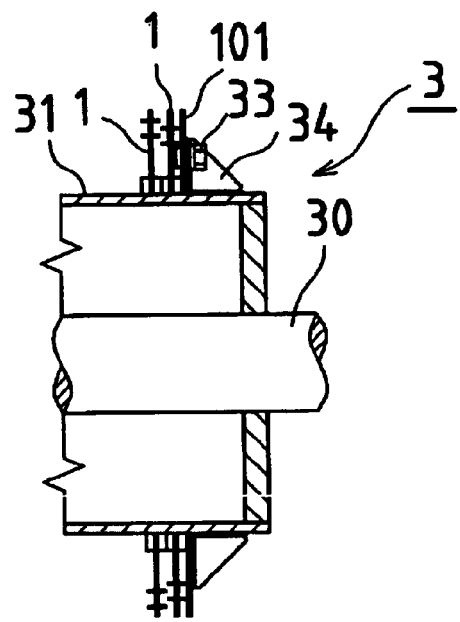
FIG. 7 is a sectional view near an end of a rotating shaft in the embodiment of FIG. 1 according to the present invention.
Figure 8:
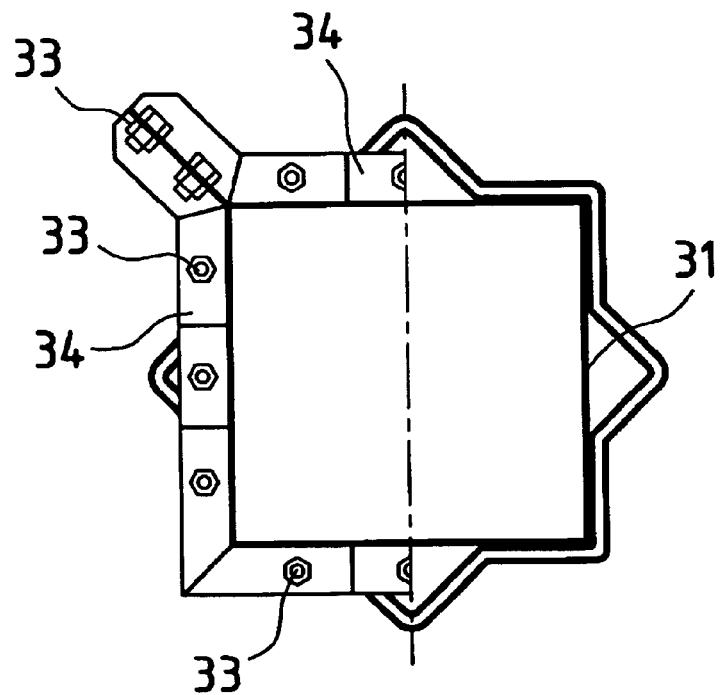
FIG. 8 is a side view near the end of the rotating shaft illustrated in FIG. 7.

Turning to FIG. 7 and FIG. 8, support plates 101 are attached to the mounting shaft 31 by means of metal fittings 34 and bolts/nuts 33, thereby fixing the inner edges 17 of the rotating discs 1. Regarding the rotating discs 1 . . . 1 which are disposed at a predetermined interval, and as illustrated in FIG. 9, the fixing rods 182 are inserted through the fixing rod insertion holes 181 formed in the rotating discs 1 . . . 1, and the ends of the fixing rods 182 are secured to the support plates 101 by bolts/nuts 183. With this structure, the rotating discs 1 follow the rotation of the rotation shaft 3 and rotate therewith.

In the thus arranged sewage treatment equipment of this embodiment, the rotating discs have a greater surface area for making contact with sewage per unit volume. Besides, the aeration effect due to the projections 192 increases the amount of oxygen supply to the sewage. Hence, the sewage treatment equipment of the present embodiment is highly efficient in sewage treatment. Moreover, this equipment can prevent biofilms on all rotating discs 1 from sloughing off at a time, which avoids deterioration of the quality of treated water. Furthermore, since the biofilms are spaced evenly, the meshes are not clogged by excessive attachment of the biofilms.

Consequently, as sewage makes sufficient contact with the aerobic bacteria attached to the rotating discs 1, the sewage can be treated satisfactorily by the aerobic bacteria. Besides, it is possible to reduce the cost for maintaining the operation.

Although each rotating disc 1 described in the above embodiment comprises four sector-shaped segments, the number of segments can be suitably determined. For example, a large rotating disc can be composed of more segments so as to enhance the strength of an entire rotating disc block. On the other hand, for small-scale sewage treatment equipment using small rotating discs, a disc with a sufficient strength can be constituted with a single segment. As the rotating disc, a plurality of sector-shaped segments may be connected together, or an integral disc-shaped member may be used as such. Whichever arrangement can be suitably selected.

With respect to the displacement angle for displacing adjacent rotating discs in the direction of rotation, the displacement angle is given by a general formula 360°/2n, wherein n is an integer not less than 1, with a proviso that each rotating disc is divided into n portions. To mount a plurality of rotating discs, they are displaced according to this displacement angle.

It should be noted that the angle given by the general formula 360°/2n is one half the central angle of the sector-shaped segment, with a proviso that a rotating disc is divided into n portions. In other words, regardless of the size and number of the sector-shaped segments, the rotating discs are displaced from each other by one half the central angle of one sector-shaped segment (the central angle of the sector-shaped. piece).

Figure 11:
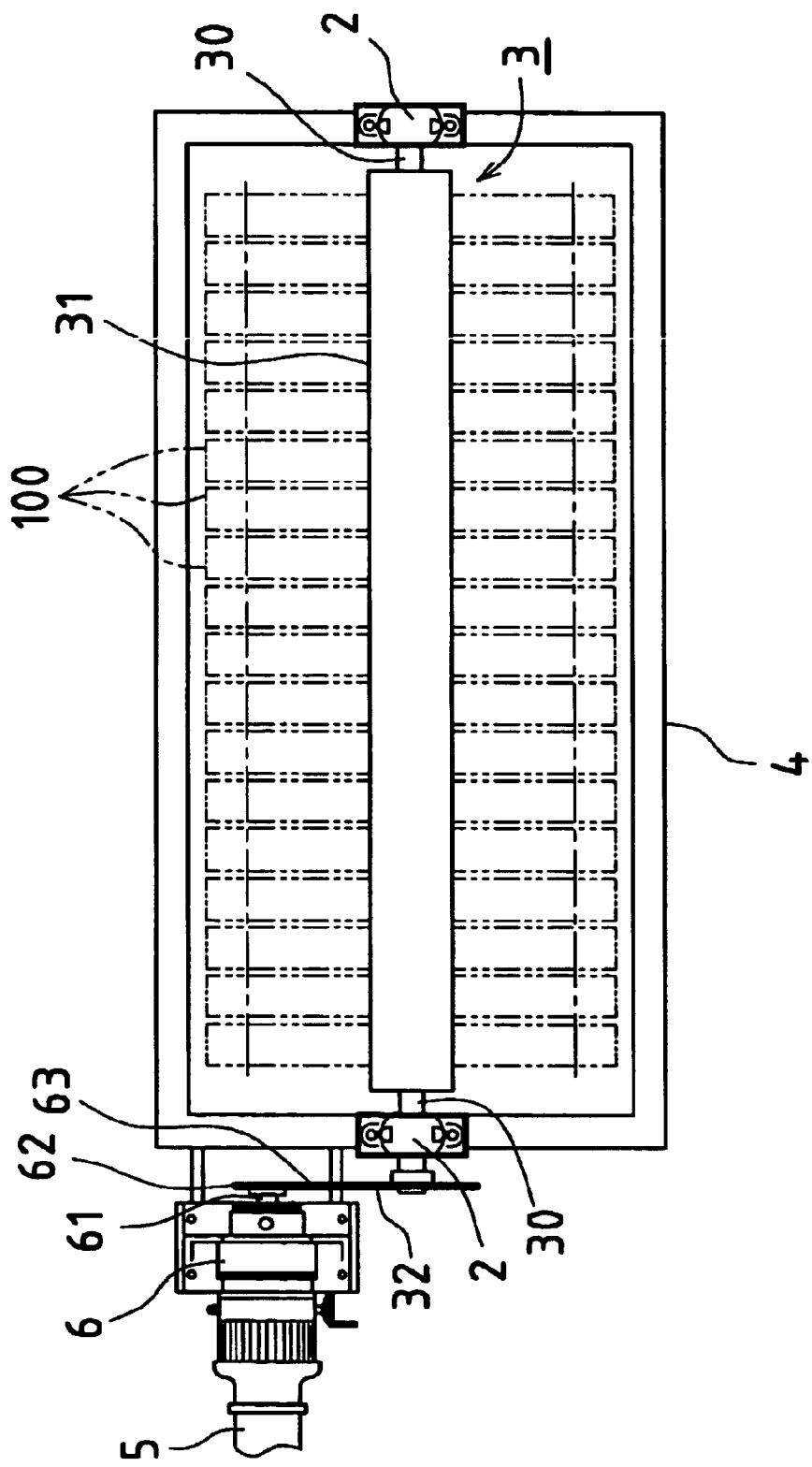
FIG. 11 is a plan view showing another embodiment of the rotating biological contactor-type sewage treatment equipment according to the present invention.

Further regarding the above embodiment, the sewage treatment equipment is equipped with two rotating disc blocks 10. In an alternative embodiment, more rotating disc blocks may be provided as shown in FIG. 11.

In this sewage treatment equipment, eighteen rotating disc blocks 100, each of which contains nine rotating discs 1, are disposed at a prescribed interval. Except for this arrangement, this embodiment is similar to the previous embodiment, and therefore further description is omitted herein. The interval between the rotating disc blocks 100 is designed to be greater than the interval between the rotating discs 1.

The equipment of this alternative embodiment can offer a greater number of gaps between the rotating disc blocks 100, which enhances the aeration effect to a further extent. Accordingly, aerobic bacteria cannot bridge the gap between adjacent rotating discs.

In the following examples, sewage was treated with the use of the sewage treatment equipment of the embodiment shown in FIG. 1 to FIG. 10 and FIG. 12 according to the present invention.

EXAMPLE 1

Length of rotation shaft 3 (L): about 1 m
Capacity of sewage treatment tank 4: about 100
Diameter of rotating discs 1 (D): 500 mm
Rotation speed of rotating discs 1: 13 rpm
Peripheral speed of rotating discs 1: 20 m/min
Proportion of each rotating disc 1
 to be submerged in sewage: about 40%
Thickness of thin elements 19
 of rotating discs 1 (T): 4 mm (FIG. 5)
Length of thin elements 19
 of rotating discs 1 (L5): 10 mm (FIG. 5)
Length of projections 192
 of rotating discs 1 (L3): 7 mm (FIG. 5)
Interval between rotating discs 1 . . . 1 (L4):
 10 mm (FIG. 9)
Number of rotating discs 1
 in each rotating disc block 10: 20 discs
Total number of rotating discs: 40 discs
The sector-shaped segments 11 constituting each rotating disc 1 were made of polypropylene and shaped by injection molding.

Comparative Example 1

According to the disclosure of Japanese Utility Model Publication No. S58-6559, sewage treatment equipment was equipped with rotating discs in each of which corrugations were formed in the circumferential direction.

For the rotating discs, 2-mm-thick polyethylene sheets were subjected to vacuum molding to give corrugated rotating discs whose area was expanded by about 25% in a projected area ratio. With these discs fused together at an interval of 20 mm, two blocks (forty discs in total) were set on the rotation shaft.

Evaluation of Example 1 and Comparative Example 1

Dissolved oxygen was measured with the use of a polarograph-type DO meter. As a catalyst, a trace of copper sulfate was added to the tank in advance. Then, about 10 grams of anhydrous sodium sulfite were added as an oxygen scavenger to consume dissolved oxygen (DO) completely. Thereafter, the rotating discs were allowed to start the rotation, and the increase rate of dissolved oxygen was obtained in a usual manner and plotted on semilogarithmic paper. After the linearity was confirmed, KLa (overall oxygen transfer coefficient) was calculated according to the expression (1) below, $$KLa = [2.303/(t_2-t_1)][\log (Cs-Ct_1)/(Cs-Ct_2)] \quad (1)$$

wherein Cs represents the oxygen saturation concentration (mg/l) at the particular temperature, and $Ct_1$, $Ct_2$ indicate the DO concentration at the measurement time $t_1$, $t_2$, respectively.

Incidentally, KLa is a mass transfer coefficient regarding the air diffusion-type oxygen supply by the activated sludge process. This coefficient is determined in view of all conditions such as the size and shape of the sewage treatment tank used in the test, the shape of the diffuser and the amount of air. In the case of the rotating biological contactor technology, the coefficient is determined in consideration of all conditions such as the shape, number, rotation speed of the disc. Also, it should be noted that Example 1 and Comparative Example 1 were conducted at a temperature of 22° C. To mention the resulting values of KLa, sewage treatment equipment of the present invention in Example 1 resulted in a KLa of 12.0 $hr^{-1}$, whereas sewage treatment equipment in Comparative Example 1 gave a KLa of 8.5 $hr^{-1}$.

This result proved that the sewage treatment equipment of the present invention according to Example 1 supplied about 40% more oxygen than that of Comparative Example 1.

As for the rotating discs in the sewage treatment equipment, the 40 rotating discs used in Example 1 according to the present invention had an effective surface area of about 21 $m^2$, whereas the 40 rotating discs used in Comparative Example 1 had an effective surface area of about 20 $m^2$.

EXAMPLE 2

In a wastewater treatment facility yard at a chemical works which conducted polymerization and processing of synthetic resins, a comparison test was carried out with the use of existing rotating biological contactor-type equipment according to a conventional technology and sewage treatment equipment concerning the present invention.

The existing rotating biological contactor-type equipment included corrugated plastic discs which were mounted on a rotation shaft, as described later. Three units of such equipment were disposed in series, and four such series were provided. In this neighborhood, one unit of sewage treatment equipment concerning the present invention was installed. The following results were obtained in this situation.

Prior to the treatment, wastewater discharged from this works showed the following properties.

BOD: 400 to 700 mg/l
COD: 180 to 300 mg/l
SS: 80 to 200 mg/l

The definition of BOD, COD and SS should be understood as below.

BOD: Biochemical Oxygen Demand
COD: Chemical Oxygen Demand
SS: Suspended Solids (floating substances)

The amount of water was 20 to 25 m³/hr in each series.

Wastewater discharged from the works was subjected to pH adjustment, and then mixed with nutrients (nitrogen and phosphorus) After homogenized in an adjustment tank, the wastewater was pumped to each series in a prescribed amount.

Part of the influent sewage into the existing rotating biological contactor-type sewage treatment equipment was continuously loaded into the sewage treatment equipment of the present invention. After the sewage was confirmed to be in the steady state near the maximum limit for the aerobic treatment, the influent and effluent were analyzed for their water quality. Based on the analysis, the performance of this equipment was compared with that of the first stage of the existing rotating biological contactor-type sewage treatment equipment (the first of the three serially disposed units).

The following is the specification of the equipment of the present invention used in the comparison test.
Diameter of rotating discs 1 (D): 1200 mm
Width of each rotating disc block 10 (L2) : 1000 mm
Number of rotating disc blocks 10: 2 blocks
Proportion of each rotating disc 1
  to be submerged in sewage: about 40%
Length of sewage treatment tank
  (internal dimension): 2.9 m
Capacity of sewage treatment tank: 1.6 m³
Effective surface area of
  each rotating disc block: 470 m²
Apparent volume of each rotating disc block: 3.0 m³
Rotation speed of rotating disc blocks: 4 rpm
Peripheral speed of rotating disc blocks: 15 m/min On the other hand, the main specification of the existing rotating biological contactor-type sewage treatment equipment is given below.
Diameter of corrugated discs: 3.6 m
Length of corrugated disc rotor: 7.5 m
Effective surface area of corrugated discs: 9400 m²
Apparent volume of corrugated discs: 72.5 m³
Capacity of reaction tank: 44 m³

On the day of the comparison test, the amount of sewage load was 3 m³/hour (i.e. 72 m³/day) for the equipment of the present invention, and 25 m³/hour (i.e. 600 m³/day) for the existing equipment. Based on the analyzed values of BOD concentration, the amount of BOD load and the amount of BOD removal were converted into the amount per unit surface area and the amount per rotor's unit apparent volume. The results were compiled in Table 1.

TABLE 1

| Equipment | Equipment of Present Invention | Existing Equipment |
|---|---|---|
| Amount of Flow (m³/day) | 72 | 600 |
| BOD concentration | | |
| Influent (mg/l) | 620 | 470 |
| Effluent (mg/l) | 190 | 160 |
| Removal rate (%) | 70 | 66 |
| Amount of BOD load per day | | |
| per Unit (kg) | 44.6 | 282 |
| Area load (g/m²) | 95 | 30 |
| Volume load (kg/m³) | 14.6 | 3.9 |
| Amount of BOD removal per day | | |
| per Unit (kg) | 31 | 186 |
| per 1 m² (g) | 66 | 20 |
| per 1 m³ (kg) | 10.2 | 2.6 |

In Table 1, the BOD concentrations of the effluent were the values obtained by analysis of supernatant of sewage which was left standing for 30 minutes.

As apparent from Table 1, judging from the values per unit surface area and per rotor's apparent volume, the BOD removal capacity of the equipment of the present invention was three times as high in terms of unit surface area, and four times as high in terms of rotor's apparent volume, as the capacity of the conventional equipment. Thus, the equipment of the present invention showed a high performance that could not have been predicted from the value of the oxygen supply capacity KLa in Example 1.

EXAMPLE 3

Sewage was wastewater from a fish processing factory for boiled fish paste and the like.

Average properties of concentrated sewage were as follows:
Amount of water: 60 m³/day
BOD: 2500 mg/l
COD(Cr): 3200 mg/l
SS: 640 mg/l
Hexane extract: 280 mg/l
T-N: 180 mg/l
T-P: 65 mg/l It should be understood that T-N (Total-nitrogen) and T-P (Total-phosphorus) mean the amounts of total nitrogen and total phosphorus, respectively.

The sewage treatment equipment of the present invention is as mentioned below.
Length of rotation shaft 3 (L): about 2.4 m
Diameter of rotating discs 1 (D): 1200 mm
Rotation speed of rotating discs 1: 10 rpm
Width of each rotating disc block 10 (L2) : 600 mm
Number of rotating disc blocks 10: 3 blocks Three units of this sewage treatment equipment were disposed in series to treat the sewage.

Comparative Example 3

The sewage treatment equipment was equipped with rotating discs which had the same shape as those used in Comparative Example 1.

However, the rotating discs had a diameter of 2.4 m, and the rotation shaft had a length of 5 m. Five units of such equipment were employed.

Evaluation of Example 3 and Comparative Example 3

Treatment using the rotating biological contactor-type equipment according to Example 3 and Comparative Example 3 gave the following values.
BOD: 80 mg/l
COD(Cr): 120 mg/l
T-N: 110 mg/l This result proved that the rotating biological contactor-type equipment of Example 3 achieved similar effects to that of Comparative Example 3, with the former's installation area being one-third as large as the latter's.

EXAMPLE 4

Living wastewater from collective housing was treated.
Average properties of the wastewater were as follows:
Amount of water: 100 m³/day (400 persons)
BOD: 220 mg/l
COD: 180 mg/l
T-N: 38 mg/l
T-P: 12 mg/l The sewage treatment equipment of the present invention is as mentioned below.

Length of rotation shaft 3 (L): 1.8 m
Diameter of rotating discs 1 (D): 1200 mm
Rotation speed of rotating discs 1: 10 rpm
Width of each rotating disc block 10 (L2): 600 mm
Number of rotating disc blocks 10: 2 blocks Three units of this sewage treatment equipment were disposed in series to treat the sewage.

Comparative Example 4

The sewage treatment equipment was equipped with rotating discs which had the same shape as those used in Comparative Example 1.

However, the rotating discs had a diameter of 2.4 m, and the rotation shaft had a length of 4.5 m. Two units of such equipment were employed.

Evaluation of Example 4 and Comparative Example 4

Regarding the rotating biological contactor-type equipment of Example 4, nitrification proceeded in only one of the units. Hence, a subsequent treatment was effected by using a fully submerged denitrification disc (diameter 600 mm, shaft length 1.8 m), and the amount of total nitrogen was reduced by 80%.

As for the rotating biological contactor-type equipment of Comparative Example 4, it was impossible to oxidize ammonia nitrogen to nitrate nitrogen by only one of the units.

EXAMPLE 5

From a main for phenol-containing industrial wastewater, a flow of 6 $m^3$/hr (maximum) was branched and subjected to treatment. The treatment targeted to achieve a COD removal rate of 70% and a phenol removal rate of 95%.

Properties of the wastewater were as follows:
BOD: 110 mg/l
COD: 110 mg/l
Phenol: 10 mg/l
Hexane extract: 50 mg/l The sewage treatment equipment of the present invention is as mentioned below.
Length of rotation shaft 3 (L): 2.1 m
Diameter of rotating discs 1 (D): 1200 mm
Width of each rotating disc block 10 (L2): 500 mm
Number of rotating disc blocks 10: 3 blocks

Comparative Example 5

Synthetic resin bristles were processed into the form of a net and integrated with a disc-shaped holder. In use of rotating biological contactor-type sewage treatment equipment, a number of such integrated members were fixed on the rotation shaft.
Length of sewage treatment tank: 2.7 m
Diameter of discs: 2 m
Number of discs: 24 discs (sufrace area 1900 $m^2$)
Rotation rate: 6 rpm

Evaluation of Example 5 and Comparative Example 5

The sewage treatment by the sewage treatment equipment of Example 5 and Comparative Example 5 gave the following results.
COD: 20 to 40 mg/l
Phenol: 2 mg/l or less The sewage treatment equipment of Example 5 was by far smaller than that of Comparative Example 5, but capable of achieving an equivalent effect.

Besides, in order to slough off thickly deposited sludge, the sewage treatment equipment of Comparative Example 5 required constant injection of air through piping running at the bottom of the sewage treatment tank. In contrast, no air injection was necessary for the sewage treatment equipment of Example 5, because excessive biofilms sloughed off naturally.

Regarding the COD mentioned in Examples 2–5, it should be understood that COD(Cr) in Example 3 refers to the COD resulting from the use of potassium dichromate, whereas COD as simply called in Example 2, 4 and 5 indicates the COD resulting form the use of potassium permanganate.

INDUSTRIAL APPLICABILITY

According to the present invention, the rotating biological contactor-type sewage treatment equipment shows a high sewage treatment efficiency and a high sewage treatment performance. Besides, this equipment is highly stable in sewage treatment and requires a low cost for maintaining its operation. In addition, the rotating discs can be shaped by a single type of mold, and the sewage treatment equipment can be assembled in a simple manner. As a result, it is possible to reduce the production cost.

What is claimed is:

1. Rotating biological contactor-type sewage treatment equipment which comprises a treatment tank for storing sewage to be treated, a rotation shaft which extends across opposed side walls of the treatment tank, a plurality of rotating discs mounted at a predetermined interval on the rotation shaft in such a manner that each rotating disc is partly submerged in the sewage stored in the treatment tank, and a driving means for supplying a driving force to the rotation shaft in order to rotate the rotating discs, the sewage treatment equipment treating sewage by rotating the rotating discs on which aerobic bacteria are attached, thereby allowing the aerobic bacteria to contact the sewage and aerobically decompose pollutants in the sewage, wherein the sewage treatment equipment is characterized in:

that each of the rotating discs is composed of n portions of sector-shaped segments, wherein n is an integer not less than 1, each of the sector-shaped segments being composed of two equally divided sector-shaped pieces and each of the sector-shaped pieces having thin elements which form meshes;

that the meshes have the same size and shape except in the neighborhood of a periphery surrounding the each sector-shaped piece, and an arrangement of the meshes is regularly aligned in the same direction relative to one side of the each sector-shaped piece;

that projections project from predetermined locations on the thin elements and extend perpendicularly relative to each surface of each rotating disc; and that, in an installation state where adjacent rotating discs are displaced from each other by 360°/2n in a direction of rotation, projections which locate on one of the adjacent rotating discs are oriented to openings in the meshes formed by the thin elements of another rotating disc.

2. The rotating biological contactor-type sewage treatment equipment according to claim 1, characterized in:

said projections project from intersections of the thin elements.

3. The rotating biological contactor-type sewage treatment equipment according to claim 2, characterized in:

that the thin elements in each of the sector-shaped pieces form square grid-like meshes of the same size, except in the neighborhood of a periphery surrounding the each sector-shaped piece; and that the thin elements extend vertically and horizontally relative to one side of the each sector-shaped piece, with crossing each other.

4. The rotating biological contactor-type sewage treatment equipment according to claim 3, characterized in that, between the two sector-shaped pieces which constitute the sector-shaped segment, the thin elements which extend vertically or horizontally relative to a side of one of the sector-shaped pieces are located at different positions, as compared with the thin elements which extend vertically or horizontally relative to a corresponding side of the other sector-shaped piece.

5. The rotating biological contactor-type sewage treatment equipment according to claim 1, 2, 3 or 4, characterized in that each of the sector-shaped pieces includes an insertion hole for passing a fixing rods which connects the plurality of rotating discs mounted at a predetermined interval, the insertion hole locating along a line which divides the each sector-shaped pieces into two equal sector-shaped portions.

* * * * *